Jan. 6, 1942.        V. J. SIGODA         2,268,626
                    PINKING SHEARS
                  Filed Jan. 23, 1941
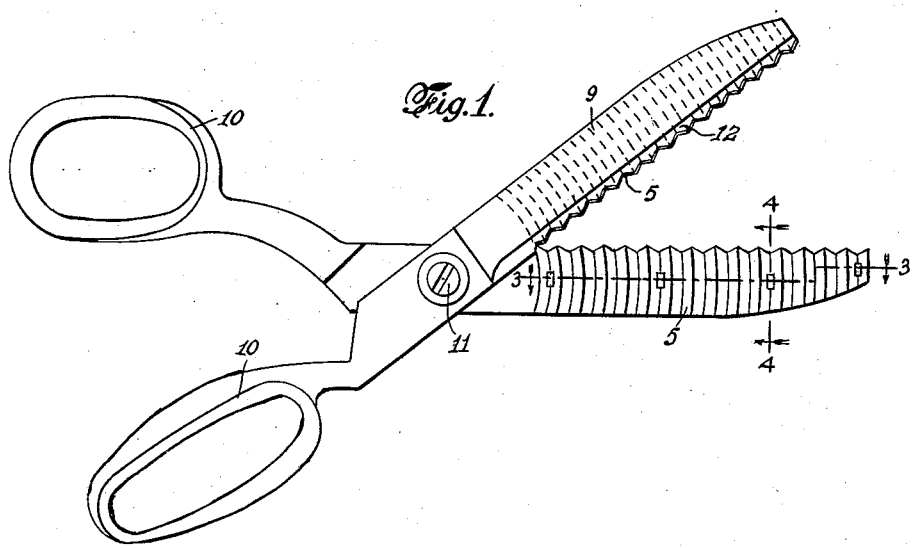
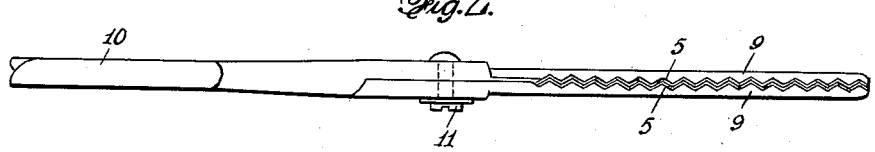
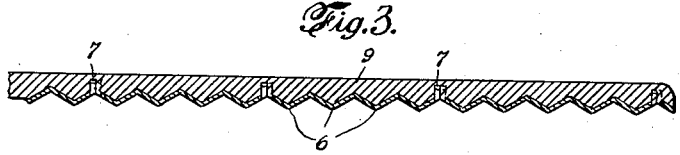    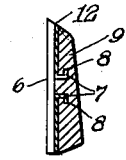
INVENTOR.
VICTOR J. SIGODA
BY  M. C. Gyddane
         ATTORNEY.

Patented Jan. 6, 1942

2,268,626

UNITED STATES PATENT OFFICE 2,268,626

PINKING SHEARS

Victor J. Sigoda, Great Neck, N. Y., assignor to Man-Sew Pinking Attachment Corp., New York, N. Y., a corporation of New York Application January 23, 1941, Serial No. 375,569

5 Claims. (Cl. 30—232)

This invention relates to pinking shears. Generically considered, it is the purpose of my present invention to provide hand operated shears of simple and inexpensive construction for ornamentally trimming or pinking the edges or seams of dress fabrics, and to simplify the method of manufacturing shears of this type whereby expeditious quantity production may be realized and which will not require the use of special apparatus or the exercise of unusual skill.

It is another object of the invention to provide a pinking shears which will be light in weight and capable of easy manipulation and in the operation of which the coacting cutting edges of the relatively movable shear blades will accurately register and not become easily dulled.

With the above and other objects in view, the invention consists in the improved pinking shears, as will be hereinafter more fully described, illustrated in the accompanying drawing and subsequently incorporated in the subjoined claims.

In the drawing wherein I have shown one simple and practical embodiment of the invention and in which similar reference characters designate corresponding parts throughout the several views:

Fig. 1 is a side elevation, the shear blades being shown in separated open position.

Fig. 2 is an edge view.

Fig. 3 is an enlarged detail longitudinal section through one of the blades taken substantially on the line 3—3 of Fig. 1, and Fig. 4 is a transverse sectional view taken on the line 4—4 of Fig. 1.

Referring in detail to the drawing, the cutting element 5 of each blade of my improved pinking shears is formed from sheet steel plate or strip, subjected to the action of cooperating die members to provide the longitudinal succession of V-shaped teeth 6, arcuately curved across the width of the plate or strip in successively decreasing degrees from one end to the other, as clearly shown in Fig. 1 of the drawing. At longitudinally spaced points, certain of these V-shaped teeth at the bases thereof have lugs or tongues 7 struck therefrom. Preferably, though not necessarily, I provide a pair of such lugs in spaced apart relation with their free ends angularly turned or bent in parallel relation to the plate or strip as indicated at 8 in Fig. 4 of the drawing.

The metallic cutting element above described is then placed in a mold which receives a phenolic condensation product such as "Bakelite," or other analogous composition material, from which the relatively movable body members of the shears are formed. This composition material, as shown in Fig. 3 of the drawing, when it becomes set or hardened is securely interlocked with one side of the metallic cutting element by the lugs 7 on the latter so that any possibility of relative movement between the cutting element and the composition body of the shear member is precluded. This part of each of the mating shear members is indicated at 9, and is integrally formed with the finger or thumb receiving loop portion 10 of said member. These parts of the two shear members are of conventional construction and between the finger and thumb receiving loops and the end sections carrying the cutting elements 5, said members are connected by the usual pivot bolt shown at 11 for relative movement. The radii of the V-shaped teeth 6 of the cutting element are concentric with the axis of the pivot bolt 11, and the cutting elements on the cooperating shear members are arranged, with respect to the pivot bolt receiving openings thereof, when said cutting elements and shear members are united in the mold as above explained, so that the salient portions of one cutting element enter the depressions or valleys of the other cutting element in the relative pivotal movement of the shear members.

As shown in Fig. 4 of the drawing, the meeting or opposing edges of the two shear members are chamfered or beveled as at 12 so that the cooperating edges of the metallic elements 5 will have a sharp cutting action upon the interposed fabric material in the operation of the shears.

It will, of course, be understood that before the assembly of the metallic cutting elements 5 with the composition shear members in the mold, said metallic elements are specially heat treated and hardened. As will be evident from Fig. 1 of the drawing, in the operation of the shear members, the V-shaped cutting edges of the elements 5 will have a self-sharpening action upon each other so that with ordinary usage, these cutting edges will not easily become dulled.

It will be evident that a pinking shears constructed as above described will be light in weight, although exceedingly durable and can be easily manipulated for the quick and accurate pinking of various kinds of fabric materials. Also, my new method of constructing and assembling the several parts results in material reduction of manufacturing costs so that my new pinking shears may be expeditiously produced by unskilled labor and profitably retailed to consumers at a cost appreciably less than that of shears of this type as heretofore used in the art.

In the illustrated example of my invention, I have shown one practical means for uniting the sheet metal cutting elements with the composition body members of the shears. This, however, is largely suggestive, and it is, of course, possible to devise various other equivalent means for accomplishing this purpose. Accordingly, it is to be understood that while I have herein shown and described one simple and practical embodiment of my improved pinking shears, the same is susceptible of more or less modification or variation in the form, construction and relative arrangement of the several parts. Accordingly, the privilege is reserved of resorting to all such legitimate changes therein as may fairly be comprehended within the spirit and scope of the appended claims.

I claim:

1. A pinking shears comprising complementary pivotally connected shear members each having a body portion formed from moldable composition material and including a blade portion, and a metallic cutting element of sheet metal extending longitudinally on one side of said blade portion and having integrally formed parts anchored in the composition material.

2. A pinking shears comprising complementary pivotally connected shear members each having a body portion formed from moldable composition material and including a blade portion, and a cutting element of sheet metal extending longitudinally on one side of said blade portion and having angularly projecting spaced lugs embedded in said composition material.

3. A pinking shears comprising complementary pivotally connected shear members each having a body portion formed from moldable composition material and including a blade portion, and a cutting element of sheet metal extending longitudinally along one side of said blade portion and provided intermediate of its longitudinal edges with spaced pairs of hook-shaped lugs embedded in the composition material.

4. A shear member comprising a sheet metal cutting element and a supporting body of composition material, said element having spaced parts interlocked with said composition body at one side thereof.

3. A shear member comprising a sheet metal cutting element and a supporting body of composition material, said element having integrally formed means upon which the body material is molded to permanently secure the cutting element to one side of said body.

VICTOR J. SIGODA.